United States Patent [19]
Arfaei et al.

[11] Patent Number: 5,633,298
[45] Date of Patent: May 27, 1997

[54] CEMENT ADMIXTURE PRODUCT HAVING IMPROVED RHEOLOGICAL PROPERTIES AND PROCESS OF FORMING SAME

[75] Inventors: Ahmad Arfaei, Chelmsford, Mass.; David C. Darwin, Columbia, Md.; Ellis M. Gartner, Silver Spring, Md.; Byong-Wa Chun, Columbia, Md.; Hideo Koyata, Waltham, Mass.; Lawrence L. Kuo, Columbia, Md.

[73] Assignee: W. R. Grace & Co.-Conn., New York, N.Y.

[21] Appl. No.: 468,294

[22] Filed: Jun. 6, 1995

Related U.S. Application Data

[60] Division of Ser. No. 299,028, Sep. 6, 1994, abandoned, which is a continuation-in-part of Ser. No. 128,939, Sep. 29, 1993, Pat. No. 5,393,343.

[51] Int. Cl.$^6$ .................................. C08F 8/34; C08K 3/00
[52] U.S. Cl. ............................ 524/5; 525/329.9; 106/728
[58] Field of Search .................... 524/5; 525/329.9

[56] References Cited

U.S. PATENT DOCUMENTS

| | | |
|---|---|---|
| 4,471,100 | 9/1984 | Trabakimoto . |
| 4,589,995 | 5/1986 | Fukumoto . |
| 4,745,159 | 5/1988 | Anzai . |
| 4,946,904 | 8/1980 | Akimoto . |
| 4,968,755 | 11/1990 | Canova . |
| 5,142,036 | 8/1992 | Akimoto . |
| 5,156,679 | 10/1992 | Gartner . |
| 5,237,017 | 8/1993 | Akiyama . |
| 5,358,566 | 10/1994 | Tanaka . |
| 5,393,343 | 2/1995 | Darwin et al. . |

FOREIGN PATENT DOCUMENTS

| | | |
|---|---|---|
| 0331052 | 2/1989 | European Pat. Off. . |
| 57-57706 | 4/1982 | Japan . |
| 58-147413 | 9/1983 | Japan . |
| 62-70250 | 3/1987 | Japan . |
| 62-78137 | 4/1987 | Japan . |

*Primary Examiner*—Helen Lee
*Attorney, Agent, or Firm*—Howard Troffkin

[57] ABSTRACT

The present invention is directed to an imidized polycarboxylic acid polymer useful as a cement admixture, to improved cement compositions containing said polymer and to a process of forming the same.

10 Claims, No Drawings

CEMENT ADMIXTURE PRODUCT HAVING IMPROVED RHEOLOGICAL PROPERTIES AND PROCESS OF FORMING SAME

This is a division of application Ser. No. 08/299,028, filed Sep. 6, 1994, now abandoned, which is a Continuation-in-Part of U.S. application Ser. No. 08/128,939, filed Sep. 29, 1993, now U.S. Pat. No. 5,393,343.

BACKGROUND OF THE INVENTION

The present invention is directed to a hydraulic cement admixture, improved cement compositions containing said admixture and to processes of forming said admixture product. Specifically, the present invention relates to a hydraulic cement admixture product composed of certain derivatives of polyacrylic acid polymers, as fully described below, which are capable of imparting high flowability to cement compositions and of causing the treated compositions to retain high flowability over a sustained period of time without imparting a significant delay in the initial set time.

Although increased flowability can be attained by using large dosages of water in a hydrating cement composition, it is well known that the resultant cement based structure will have poor compressive strength and related properties. Various additives have been proposed to increase the flowability (known as "slump") of cement composition, such as mortar and concrete compositions, without increasing the water content of the initially formed composition. Such additives have been classified as "cement superplasticizers" and include, for example, compounds, such as naphthalene sulfonate-formaldehyde condensates lignin sulfonates and the like.

More recently, copolymers of alkenyl ethers and acrylic acid or maleic anhydride, and derivatives thereof, have been proposed as agents suitable to enhance slump [Japanese Patent Publication (Kokai) Nos 285140/88 and 163108/90]. Further, copolymers formed from the copolymerization of hydroxy-terminated allylether and maleic anhydride or the allylether and a salt, ester or amide derivative of maleic anhydride such as disclosed in U.S. Pat. No. 4,471,100 have been proposed as cement admixtures capable of enhancing slump.

In each of the above instances, the proposed cement admixture material when used in a cement composition does not provide the desired combination of properties or only provide them in low degrees. For example, esterified acrylate copolymers, while providing good slump enhancement, also causes the treated cement composition to exhibit excessive set retardation.

Prior acrylic acid polymer derivatives have been formed by first reacting acrylic acid with the derivative forming amine and then subjecting the vinyl amide monomer to vinyl polymerization conditions. Such polymerization is difficult to control, provides product of a wide distribution of molecular weight and does not permit desired imide moieties to be present in the resultant polymer.

It is highly desired to have an admixture which is capable of imparting to a treated cement composition, a high degree of slump, of preventing a decrease in slump (decrease in flowability) over a sustained period of time, and at the same time, not causing the composition to exhibit excessive set retardation.

It is further highly desired to provide a simple process for forming the desired polymeric admixture.

SUMMARY OF THE INVENTION

The present invention is directed to the formation of imidized derivatives of carboxylic acid group containing polymers wherein the carboxyl groups are positioned alpha-beta and/or alpha-gamma with respect to one another, such as polymer products disclosed in copending U.S. application Ser. No. 08/128,939.

The present invention is directed to an improved hydraulic cement admixture product, hydraulic cement composition containing such product, and to a process for forming said product. The admixture product can be represented by the general formula:

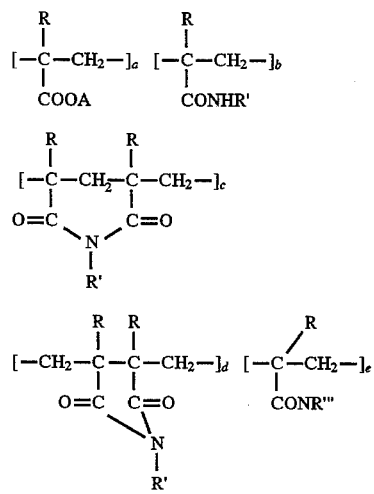

wherein each R independently represents hydrogen atom or a methyl ($CH_3$—) group; R' represents a hydrogen atom or a $C_2$–$C_{10}$ (preferably $C_2$–$C_4$) oxyalkylene group (BO) or a plurality (1–200, preferably from 1 to 70) of said groups which is terminated with a $C_1$–$C_{10}$ alkyl group (R") or mixtures thereof; A represents a hydrogen atom, a $C_1$–$C_{10}$ alkyl group, R' or an alkali or alkaline earth metal cation or a mixture thereof; NR'" represents a radical group derived from a cyclic ring compound having at least one secondary nitrogen as part of the ring, and a, b, c, d and e each represent molar percentages of the polymer's structure such that a is an integer of from about 50 to 70; the sum of c plus d is at least about 2 to a value of (100–a+b) and is preferably from 2 to 10; e is a value of 0 to about [100–(a+b)]; and b is not more than [100–(a+c+d+e)].

The process of forming the above admixture product comprises reacting a preformed polymer having carboxylic acid groups with an amine or hydroxy terminated oxyalkylene compound at elevated temperature with continuous withdrawal of water, as fully described below.

DETAILED DESCRIPTION OF THE INVENTION

The present invention is directed to an improved cement admixture product and to cement compositions formed with said product and to a process of forming said product. The presently described improved cement admixture product has been unexpectedly found to provide a cement composition, such as mortar or concrete, having high flowability over an extended period of time without imparting a significant delay in the initial set time of the composition. Thus the presently achieved cement compositions are capable of being readily formed into a desired shape, having substantial self-leveling properties and can be worked over an extended period from commencement of hydration. At the same time, the presently achieved cement compositions do not exhibit extensive delay in set and, therefore, do not delay the timetable for forming the desired structure.

The cement admixture product of the present invention is composed of an imidized acrylic polymer, as fully described below, alone or as a uniform mixture with hydraulic cement. The cement can be selected from any conventional hydraulic cements such as, for example, normal portland cement (meeting the requirements of ASTM C-150), high early strength portland cement, ultra high early strength portland cement, blast-furnace slag cement, fly-ash cement, blended portland cements, calcium aluminate cements, calcium sulfate cements, magnesium phosphate cements and the like.

The subject polymers are imidized acrylic polymers. The term "acrylic polymer", as used herein and in the appended claims can be selected from homopolymer or copolymer of acrylic acid, methacrylic acid, their alkali metal salts as well as their $C_1$–$C_{30}$ alkyl esters and/or polymers formed from other monomeric compounds having ethylenic unsaturation suitable for vinyl polymerization and providing alpha-beta or alpha-gamma positioned carboxylic acid groups, such as maleic anhydride, maleic acid and salts thereof. In addition, the acrylic polymer reactant and the resultant imidized acrylic polymer may contain units derived from other singly and doubly ethylenically unsaturated monomers, such as styrene, alpha-methylstyrene, sulfonated styrene, acrylonitrile, butadiene and the like. Such other ethylenically unsaturated monomer derived units, when present, can be present in the subject polymer in amount of up to about 20 (preferably, up to about 10) weight percent of the total polymer provided that the resultant imidized acrylic polymer is water soluble. Such other ethylenically unsaturated monomer derived units, although not shown in the structural formula exemplifying the subject imidized acrylic polymer, are contemplated to optionally be a part thereof.

The imidized acrylic polymer found useful in the present invention has a structural formula (I) of:

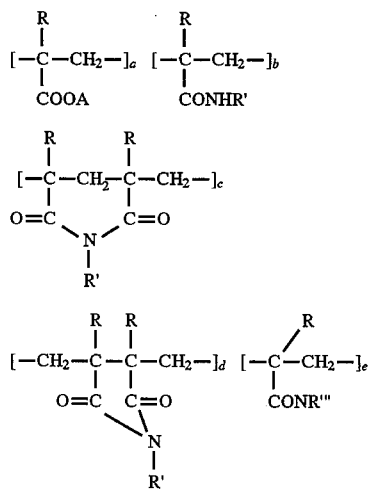

wherein each R independently represents hydrogen atom or a methyl ($CH_3$—) group; R' represents a hydrogen atom or a $C_2$–$C_{10}$ (preferably $C_2$–$C_4$) oxyalkylene group (BO) or a plurality (1–200, preferably from 1 to 70) of said groups which is terminated with a $C_1$–$C_{10}$ alkyl group (R") or mixtures thereof; A represents a hydrogen atom, a $C_1$–$C_{10}$ alkyl group, R' or an alkali or alkaline earth metal cation or a mixture thereof; NR'" represents a radical group derived from a heterocyclic ring compound having at least one secondary nitrogen as part thereof; and a, b, c, d and e represent molar percentages of the polymer's structure such that a is an integer of from about 50 to 70; the sum of c plus d is at least about 2 to a value of [100–(a +b)] and is preferably from 2 to 10; e is a value of 0 to about 10; and b is not more than [100–(a+c+d+e)].

The preferred imidized polymer is represented by the above formula in which A is a hydrogen atom or an alkali metal cation; R' is at least from 50 to 90 weight percent of the polymer and comprises polyoxyethylene or polyoxypropylene units or mixtures thereof.

Further, a preferred imidized acrylic polymer of the present invention has a portion of the molar percentage of the "a" monomeric units composed of units wherein A represents R' and the remainder of A represents hydrogen or alkali metal ion. The amount of "a" units wherein A represents R' can be from 2 to 30 percent of the total "a" molar units. Still further, it is preferred that "a" has a numerical value of from 60–70; and the sum of "c" plus "d" is a numerical value of at least 3 to a value of [100–(a+b)].

The present imidized acrylic polymer is formed by a process of reacting a preformed acrylic polymer with a primary amine containing a compound, as fully described herein below. The reactants can further include secondary amine-containing heterocyclic compounds and/or hydroxy terminated oxyalkylene compounds. The use of a preformed acrylic polymer, as required by the present process, provides a resultant cement admixture product of well controlled molecular weight and of the desired constituents.

The acrylic polymer reactant useful herein are low molecular weight polymers which are soluble in polar solvents such as water. They should have a number average molecular weight of from about 1,000 to 100,000, preferably from about 1,500 to 20,000. The acrylic polymer reactants of both homopolymer and copolymer character are formed by conventional free radical polymerization and are commercially available.

The imidized acrylic polymer is formed by reacting an acrylic polymer with ammonia or an alkoxylated amine. When an alkoxylated amine (preferred) is used as a reactant, the imidization may be carried out neat, as the acrylic polymers are soluble in such amines. It is preferred to commence the imidization in the presence of small amounts of water.

The amine reactant useful in forming the desired imidized acrylic polymer can be selected from ammonia or an alkyl-terminated alkoxy amine represented by the formula:

$$H_2N—(BO)_n—R" \qquad (II)$$

in which BO represents a $C_2$–$C_{10}$ (preferably a $C_2$–$C_4$) oxyalkylene group in which O represents an oxygen atom and B represents a $C_2$–$C_{10}$ (preferably $C_2$–$C_4$) alkylene group or mixture; and R" represents a $C_1$–$C_{10}$ (preferably $C_1$–$C_4$) alkyl group and n is an integer selected from 1 to 200 preferably from 10 to 120.

The amine reactant is normally used in from about 5 to 90 mol percent and preferably from 10 to 20 mol percent based on the acrylic acid units present in the acrylic polymer.

In addition to the alkoxylated amine reactant, the acrylic polymer can be further formed with hydroxy terminated oxyalkylenes represented by the formula $$HO—(BO)_n—R" \qquad (III)$$

wherein BO, R" and n are defined in formula II above. The hydroxy terminated compound, when present, is normally used in a mole ratio of amine terminated to hydroxy terminated compound of from about 0.5 to 1.5. The compounds of formula III react with the carboxyl groups of the acrylic polymer to provide a portion of the A constituent of the imidized acrylic polymer product of formula I.

The subject polymer can also contain small amounts of derivatives of compounds II and III in which R" of compound II is a primary amino group and R" of compound III is a hydroxyl group. Such derivatives have the formula $Z(BO)_nZ$ where each Z is a primary amino or a hydroxyl group. The resultant polymer provides extended high slump properties. These derivatives may be present in up to 8 percent, preferably up to 5% provided that the resultant product is water soluble.

Another class of reactant which may optionally be used in forming the subject imidized acrylic polymer of the present invention are heterocyclic compounds having a secondary amine as part of the ring structure as represented by a formula NHR'" wherein R'" represents a 4 to 7 member ring with the secondary nitrogen atom. The ring may contain other hetero atoms such as nitrogen and oxygen as part of the ring in addition to the secondary nitrogen atom. Such compounds include, for example, pyrrolidine, pyrroline, pyrazolidine, imidazolidine, piperidine, indoline, morpholine and the like. These heterocyclic reactants provide the formation of polymer units of formula I providing units of "e" moles. The inclusion of such heterocyclic moieties provide a resultant polymer product with still further capability to enhance (reduce) the set retardation and air entraining properties of the treated cement.

The acrylic polymer and amine reactants alone or further combined with a hydroxy terminated reactant and/or a heterocyclic reactant form the desired imidized acrylic polymer by heating the reactants either in an aqueous solution or neat at elevated temperatures of from about 60° C. to 250° C. and most preferably from 100° C. to 200° C. The reaction is carried out under ambient pressure or, under a pressure lower than ambient pressure. Further, when the reaction is carried out under ambient or substantially ambient pressure it is preferred to conduct the reaction while passing air or nitrogen gas over the liquid reaction medium or by bubbling the gas through the medium to remove water and other low molecular weight by-products from the reaction zone.

The reactants are contacted with each other under elevated temperature. Temperatures of greater than about 150° C. (preferably between 150° and 200° C.) is required when the reactants are contacted in the absence of a catalyst, such as described below. When a catalyst is employed the reaction temperature required can be substantially reduced. Catalyst enhanced reaction normally can be carried out at temperatures of at least about 60° C., preferably from about 100° to 140° C. The desired imidization occurs more readily when using higher reaction temperatures. Therefore, when optional reactants are also employed it is desired to carry out the reaction as a two step process by first heating the reactants to greater than 150° C. for a period of time to cause the primary amine reactant to substantially combine with the polymer carboxyl groups and then to lower the reaction temperature to 75°–140° C. (preferably 100° to 130° C.) introduce a catalyst, as described below, and maintain the lower temperature for a period to permit substantial completion of the reactants with the acrylic polymer.

The optimum condition will depend on the particular reactants used and the degree of reaction desired. The exact condition can be determined by simple experimentation.

The imidization reaction can be enhanced by conducting the reaction in the presence of a basic catalyst, an acid catalyst and/or a transamination catalyst. Such catalysts may be selected from a tertiary amine, such as dicyclohexylamine, 1,1,3,3-tetramethylguanidine, 1,3-diphenylguanidine, quinoline, isoquinoline, 4-benzylpyridine, 4-phenylpyridine, 2,3-benzodiazine, 1,4-benzodiazine, 1-benzazine, 1,3-benzodiazine, N,N'-dicyclohexylcarbodiimide, 2,2'-bipyridyl, 2,3'-bipyridyl, 2,4'-bipyridyl or such catalyst can be selected from the group consisting of p-toluenesulfonic acid, HCl, $Sb_2O_3$, $Ti(OC_4H_9)_4$, $NaNH_2$, $SnO_2$, potassium or sodium alkoxides, manganese acetate, and the like. The catalyst can be present in amounts of from 0.1 to 5 weight percent based on the amine reactant.

The reactants are contacted with each other at the above described reaction conditions for from about 1 to 8 hours and preferably from about 1.5 to 3 hours. When a two-stage process is conducted, the first stage is carried out for 1 to 2 hours and then, with reduction in temperature, the second stage is carried out for 1 to 3 additional hours. During the course of the reaction, water (a by-product) is removed to drive the reaction to imidization. When the reaction is carried out at ambient or substantially ambient pressure, the removal of water can be enhanced by sweeping a gas, such as nitrogen, through the reaction zone.

The degree of reaction can be substantially monitored by the amount of water removed from the reaction zone. Upon completion of the reaction, the reaction product is cooled, filtered and, optionally, neutralized with an aqueous alkali or alkaline earth metal base.

The imidized acrylic polymer is normally a high-boiling viscous liquid which is substantially soluble in water. In most instances, the polymer is soluble in all proportions.

The improved cement of the present invention is composed of a substantially uniform mixture of the hydraulic cement and the imidized acrylic polymer which are both described herein above. The imidized acrylic polymer should be present in from 0.005 to 5 (preferably from 0.03 to 1 and most preferably from 0.05 to 0.3) weight percent based on the weight of hydraulic cement. In order to aid in forming the uniform mixture, the imidized acrylic polymer can be mixed with the cement as an aqueous solution having from about 30 to 50 weight percent imidized acrylic polymer solids in the solution.

The imidized acrylic polymer treated cement can be formed at any stage of the cement's formation or use. For example, the polymer can be mixed at the cement mill with clinker cement raw material during its grinding to form cement powder. It can also be applied to the cement powder during its blending with other dry materials to prepare a specific type of cement, such as blended cement, pozzolanic cement and the like.

Alternately, the improved cement can be formed in situ during the course of preparing a cement composition such as a mortar mix (hydraulic cement, sand and water) or a concrete (hydraulic cement, sand, large aggregate, such as stone, and water). The instant imidized acrylic polymer can be added (conventionally as an aqueous solution) as part of the water of hydration or can be added separately. In the later method of application, the water of the aqueous polymer solution should be calculated as part of the total water content of the cement composition.

As stated above, the imidized acrylic polymer of the improved cement (whether as a dry blend of cement and polymer or as formed in situ as part of the formation of a wet unset cement composition) should be from 0.005 to 5, preferably from 0.03 to 1 and most preferably from 0.05 to 0.3 weight percent of solid imidized acrylic polymer based on the weight of solid hydraulic cement of the cement composition.

Cement compositions formed with the present improved cement have a significantly higher degree of flowability (higher degree of slump), than compositions formed with conventional hydraulic cement. Further, the present cement compositions are capable of retaining their high degree of slump over a sustained period of time giving the artisan an extended period to work the cement composition into its final shape. Finally, the present cement composition achieves initial set without exhibiting excessive retardation. Thus, the use of this cement composition does not cause delay of the working time required to form a particular structure.

Conventional cement additives, such as air entrainers, water proofing agents, strength enhancers, corrosion inhibitors, antifoaming agents and curing accelerators can be used with the subject cement additive. These additives can be mixed with the cement composition prior to, along with or subsequent to the addition of the present cement additive.

The present invention is further explained by the following examples which are given for illustrative purposes only and are not meant to limit the invention, as defined by the claims, appended hereto. All parts and percentages are by weight unless otherwise stated.

EXAMPLES

Example 1

40 parts of solid polyacrylic acid of 5000 molecular weight was added to 60 parts of a polyethylene-polypropylene oxide polymer of molecular weight 700 which is terminated at one end with a primary amine group and at the other end by a methyl group. The reaction mixture was stirred for 30 minutes at ambient temperature followed by 1 hour and 10 minutes at 180° C. under a blanket of flowing nitrogen gas. The water by-product was removed in the nitrogen gas stream. The resultant product was a viscous amber liquid. The liquid was analyzed by infrared spectroscopy and the resultant spectra had peaks at 1720 cm$^{-1}$, 1630 cm$^{-1}$, and 750 cm$^{-1}$ which indicates the presence of imide groups. This liquid was also analyzed by conductiometric titration and the nitrogen linkages were found to have an 4:1 amide:imide group ratio.

Example 2

7.5 parts of solid polyacrylic acid of 2000 molecular weight was dissolved in 7.7 parts deionized water. To this resultant solution was added 52.1 parts of a polyethylene-polypropylene oxide polymer of molecular weight 2000 which was terminated at one end by a primary amine group and at the other end by a methyl group. The mixture was heated and maintained at 180° C. under a flowing nitrogen gas blanket for a total of 2 hours to remove the water of solution and that formed as a reaction by-product. The resulting product was an amber viscous liquid.

Example 3

25 parts of a 50% aqueous solution of a polyacrylic acid of 5000 molecular weight was combined with 52 parts of a polyethylene-polypropylene oxide polymer of molecular weight 2000 which was terminated at one end by a primary amine group and at the other end by a methyl group. The mixture was heated and maintained at 180° C. while under flowing nitrogen gas stream for a total of 2 hours. The water of solution and formed as by-product was removed in the nitrogen gas stream. The resulting product was an amber viscous liquid.

Example 4

30 parts of a 65% aqueous solution of a polyacrylic acid of 2000 molecular weight was mixed with 29.3 parts of a (polyethylene-polypropylene) oxide polymer of molecular weight 700 which was terminated at one end by a primary amine group and at the other end by a methyl group. The mixture was heated under flowing blanket of nitrogen gas at 180° C. for 1 hour and 30 minutes. The water of the solution and from the reaction was removed by the nitrogen gas stream. The resulting Product was an amber viscous liquid.

Example 5

19.2 parts of a 65% aqueous solution of a polyacrylic acid of 2000 molecular weight was combined with 3.0 parts of 30% aqueous solution of ammonia. To the solution was then added 48 parts of a polyethylene-polypropylene oxide polymer of molecular weight 700 which was terminated at one end by a primary amine group and at the other end by a methyl group. The mixture was heated and maintained at 180° C. while under flowing nitrogen gas stream for a total of 30 minutes. The water of the solution and that formed as a by-product was removed in the nitrogen stream. A yellow creamy liquid was isolated as the product and was determined to contain both reacted ammonia and alkoxyamine groups.

Example 6

154 parts of a 50% solution in water of polyacrylic acid of 2000 molecular weight was added to 312 parts of a polyethylene-polypropylene oxide polymer of molecular weight 2000 which was terminated at one end by a primary amine group at the other end by a methyl group. The mixture was heated and maintained at 180° C. under flowing nitrogen gas stream for a total of 7 hours until substantially all of the water was removed. The resulting product was an amber viscous liquid.

Example 7

5.2 parts of a polymethacrylic acid of molecular weight 3400 was dissolved in 8.2 parts of distilled water. After 45 minutes, the polymethacrylic acid was completely dissolved and 18.0 parts of a polyethylene-polypropylene oxide polymer of molecular weight 2000 terminated at one end by a primary amine and terminated at the other end by a methyl group was added. The mixture was stirred at room temperature for 30 minutes. Heat was applied at 180° C. under flowing nitrogen for 1 hour. The resulting product was an amber viscous liquid.

A sample of the resultant imidized acrylic polymer was tested as part of an ordinary portland cement mortar in a method based on Japanese Industrial Standard (JIS) A6204. A sand/cement/water ratio of 1/3/0.50 was used with the polymer dissolved in the water to give a dosage of 0.15% solid polymer based on solid cement (s/s). In order to eliminate the effects of air on the flow of the mortar, a commercial defoamer was employed at 20–30 ppm based on the weight of cement. Set times were measured using an automated penetrometer on a sample formed using 0.20% s/s dosage of polymer. Results of these tests are given in Table 3 below.

Example 8

Each of the formed imidized acrylic polymers of Examples 1,3,4,5 and 6 were formed into 50% aqueous solutions with deionized water. Each of the solutions was used in forming a cement composition composed of standard hydraulic portland cement and water. The polymer to cement weight ratio (solid polymer/solid cement, s/s) was 0.002 and the water to cement ratio was 0.5. A miniature slump test developed by Kantro as described in "Cement, Concrete and Aggregates'" Vol. 2, No. 2, Page 95 1980 was used to measure slump of each sample. Set was measured by an automated penetrometer. The results for samples of Examples 2–6 are given in Table 1 below. Further, samples of a concrete cement composition were treated with the imidized acrylic polymer of Example 6 and, for comparative purposes, with a conventional concrete superplasticizing agent, naphthalene sulfonate formaldehyde condensate ("NSFC"), in dosages set forth in Table 2 below. The concrete mix design was composed of: portland cement at a rate of 600 lbs/yd$^3$; sand at a rate of 1400 lbs/yd$^3$; coarse aggregate (crushed stone) at a rate of 1700 lbs/yd$^3$ and water (including from admixture) in 300 lbs/yd$^3$. These samples and a blank were tested according to ASTM C143 for slump, ASTM C403 for set, and ASTM C39 for compressive strength. A commercial defoamer was also incorporated to eliminate air effects on slump and compressive strength. The results of these tests are given in Table 2 below.

TABLE 1

| | | Cement Paste Results | | | | | |
|---|---|---|---|---|---|---|---|
| | | Minislump spread (cm) | | | | | |
| Preparation | Dosage (% s/s) | 9 min. | 18 min. | 30 min. | 45 min. | 60 min. | Set time (min.) |
| Blank | — | 14.9 | 13.9 | 12.6 | 10.9 | 10.0 | 187 |
| Example 2 | 0.2 | 19.8 | 20.4 | 20.0 | 19.3 | 18.3 | 327 |
| Example 3 | 0.2 | 20.7 | 24.4 | 22.3 | 20.4 | 18.4 | 334 |
| Example 4 | 0.2 | 18.1 | 18.5 | 18.8 | 17.5 | 16.5 | 342 |
| Example 5 | 0.2 | 18.7 | 20.2 | 17.6 | 17.5 | 16.6 | 288 |
| Example 6 | 0.2 | 21.6 | 20.9 | 22.0 | 18.9 | 18.9 | 287 |

TABLE 2

| | | Concrete Results | | | | | | | |
|---|---|---|---|---|---|---|---|---|---|
| | | Slump | | | | | Compressive Strength | | |
| Preparation | Dosage (% s/s) | (in. at 9 min.) | (in. at 18 min.) | (in. at 30 min.) | (in. at 45 min.) | Set (hr:min) | 1 day (psi) | 7 day (psi) | 28 day (psi) |
| Blank | — | 2.75 | NM | NM | NM | 4:20 | 1782 | 5140 | 6097 |
| Example 6 | 0.125 | 8.00 | 7.25 | 5.25 | 3.00 | 4:14 | 2012 | 5182 | 6442 |
| NSFC | 1.00 | 8.00 | 5.50 | 3.25 | 2.50 | 5:23 | 1683 | 3641 | 5872 |

The results of Table 2 clearly show that the present imidized acrylic polymer admixture containing cement composition provides a high initial slump, retains a high slump over a sustained period, has substantially no set retardation and exhibits enhanced compressive strength when compared to the untreated cement composition and to a cement composition containing a conventional superplasticizer, NSFC.

TABLE 3

| | Mortar Flow Results | | | | |
|---|---|---|---|---|---|
| | | Flow | | | |
| Preparation | Dosage (% s/s) | 4 min. (mm) | 30 min. (mm) | 60 min. (mm) | Set[1] (hr:min) |
| Blank | — | 105 | NM | NM | 5:00 |
| Example 7 | 0.15 | 220 | 197 | 163 | 5:30 |

[1]Set measured at 0.20% s/s of Example 7.

Example 9

Polymer Admixture Product

A. 20 parts of a polyacrylic acid powder having a number average molecular weight of 2000 was mixed with 40 parts of a commercially available methoxy terminated polyoxyethylene amine (Jeffermine M-2070) of a weight average molecular weight of 2000 and 80 parts of a methoxy terminated polyoxyethylene amine (Jeffermine M-1000) having a weight average molecular weight of 1000. The mixture was formed in a reactor equipped with a mechanical stirrer, a nitrogen gas inlet and a condenser equipped with a Dean-Stark trap. The mixture was slowly heated to 70° C. under a nitrogen gas flow. Upon attaining 70° C., 21 parts of dicyclohexylcarbodiimide was added and the mixture was maintained at 70° C. for 4 hours with removal of water reaction by-product. The reaction product was cooled to ambient conditions and neutralized with aqueous sodium hydroxide solution and additional water to form an aqueous solution containing forty percent solid neutralized product.

B. The process described in A above was repeated except that an aqueous solution containing 40 parts of the solid polyacrylic acid was used instead of the powder material. The mixture was initially heated to 120° C. with water removal. When the water attributable to the polymer solution initially added was removed, 0.2 part of p-toluene sulfonic acid was introduced into the reaction mixture instead of carbodiimide and the mixture was maintained at 120° C. for 4 hours. The resultant product was a viscous oil which was neutralized and the aqueous solution was labeled Product B.

C. The process described in A above was repeated except that an aqueous solution containing 40 parts of the polyacrylic acid was used instead of the powder material. The polyacrylic acid was mixed with 40 parts Jeffamine M-2070, 20 parts Jeffamine M-1000 and 0.87 part morpholine. Water was initially distilled off at 180° C. for 2 hours and then the temperature was reduced to 120° C., 0.58 part p-toluene sulfonic acid was added and the reaction was continued for two (2) hours more. The resultant product was a viscous yellow oil which was neutralized and its aqueous solution was labeled Product C.

D. The process described in A above was repeated except that an aqueous solution containing 40 parts of polyacrylic acid was used instead of the powder material. This was mixed with 80 parts Jeffamine M-1000 at 170° C. for 2 hours with removal of water and then reduced to 120° C., 0.5 part p-toluenesulfonic acid added and further mixed for two (2) hours. The resultant product was a viscous oil which was neutralized and its aqueous solution was labelled Product D.

E. The process described in D above was repeated except 80 parts of polyacrylic acid (as aqueous solution) was mixed with 180 parts Jeffamine M-1000. The reaction mixture was maintained at 170° C. for 2.5 hours. No p-toluenesulfonic acid was added. The product was a viscous oil which was neutralized and the aqueous solution was labelled Product E.

F. A process described in A above was repeated using 20 parts polyacrylic acid powder, 10 parts Jeffamine M-2070 and 80 parts of a commercially available polyethylene ether/propylene ether glycol having one end terminated with a methoxy group, and having a weight average molecular weight of 2000. The reaction was initially carried out at 110° C. for 1 hour after which p-toluenesulfonic acid was added and the reaction was continued for 2 more hours. The product was a viscous yellow oil which was neutralized and made into an aqueous solution labelled Product F.

G. A process described in D above was repeated except that 76 parts of Jeffamine M-2070 was used instead of Jeffamine M-1000. In addition, 0.9 part of a poly(oxyethylene)(oxypropylene) copolymer having terminal primary amine groups (Jeffamine ED-900), weight average molecular weight of 900 and a propylene/ethylene mole ratio of 2.5 to 15.5 was also introduced into the reaction mixture. The mixture was heated at 170° C. for four (4) hours under a partial vacuum. The product was a viscous oil product which was neutralized and made into an aqueous solution labelled Product G.

H. The process described in G above was repeated except that four (4) parts of Jeffamine ED-2000 was used instead of Jeffamine ED-900. Jeffamine ED-2000 is a poly(oxyethylene)oxypropylene) copolymer having terminal primary amine groups, a weight average molecular weight of 2000, and a propylene/ethylene mole ratio of 2.5/40.5. The product was a viscous oil which was neutralized and made into aqueous solution labelled Product H.

Example 10

Concrete Admixture

Each of the polymer solutions A–H of Example 9 above was used in formulating concrete samples which were tested for slump, air content, set time, and compressive strength. All samples were formed according to a modified ASTM C-1017-92. The parts of portland cement was 611 parts; of sand was 1700 parts; of gravel was 1359 parts and water was 285. The water to cement ratio was 0.47. The subject additive was employed with a commercial defoamer for cement. The dosages (S/S=solid additive based on solid portland cement of concrete composition) are listed in Table 4 below and tabulated with respect to the results of the test for each of the samples produced.

The concrete samples were not all formed at the same time. Therefore, a glank was formed for each of the tests to provide a more accurate determination of the effects of the admixture versus a blank. The results shown in the table below gives values for test sample/blank sample. The slump was measured by ASTM C-143; air by ASTM C-231; and compressive strength by ASTM C-39 and set time by ASTM C-403.

TABLE 4

| Admixture Product | Dosage % S/S | Other Additive | Dosage % S/S $10^{-5}$ | Slump Inch @ 9 min | Air % | Initial Set h:min/h:min Blank | Compressive Strength PSI 7 days | 28 days |
|---|---|---|---|---|---|---|---|---|
| A | 0.125 | Defoamer | 225 | 8.0/2.7 | 3.5 | 6:19/5:04 | 5374/5340 | 7305/7128 |
| B | 0.14 | Defoamer | 225 | 5.3/2.9 | 2.5 | 6:20/4:52 | 4363/4525 | 6140/6380 |
| C | 0.12 | Defoamer | 200 | 9.1/3.1 | 1.8 | 5:56/4:06 | 5009/4764 | 6070/6391 |
| D | 0.08 | Defoamer | 200 | 8.5/2.7 | 2.3 | 6:01/4:53 | 5315/5517 | 6900/6904 |
| E | 0.08 | Defoamer | 200 | 8.5/2.9 | 2.6 | 4:33/4:06 | 5348/5111 | — |
| F | 0.12 | Defoamer | 200 | 5.1/3.1 | 2.7 | 4:31/4:06 | 4908/4764 | 6145/6391 |
| G/E | 0.06/0.06 | Defoamer | 200 | 8.5/2.8 | 2.8 | 5:08/4:08 | 5833/6112 | — |
| H/E | 0.06/0.06 | Defoamer | 200 | 7.2/2.8 | 3.1 | 5:18/4:08 | 5983/6112 | — |

All of the above samples illustrated that the subject polymer product provided a combination of high slump characteristics, without causing excessive increase in initial set or adversely effecting compressive strength of the concrete formed.

What is claimed:

1. An imidized acrylic polymer composed of units represented by the structural formulae:

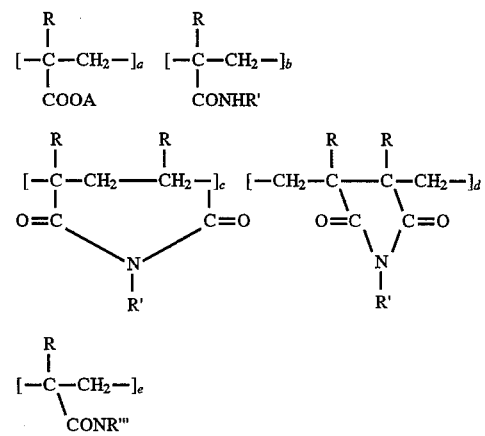

wherein each R independently represents hydrogen atom or a methyl ($CH_3$—) group; R' represents a (i) hydrogen atom, (ii) a $C_2$-$C_{10}$ oxyalkylene group represented by $(BO)_nR''$ in which O represents an oxygen atom, B represents a $C_2$-$C_{10}$ alkylene group or mixtures thereof, R'' represents a $C_1$-$C_{10}$ alkyl and n represents an integer of from 1–200, or (iii)

mixtures thereof; A represents a $C_1$–$C_{10}$ alkyl group, R', an alkali metal cation or mixtures thereof; NR'" represents a heterocyclic group of which N is a part thereof; and a, b, c, and d are numerical values representing molar percentage of the polymers structure such that a is a value of about 50 to 70; the sum of c+d is a value of from about 2 to about 10; and b is a remainder value of {100–(a+c+d+e)}; and e is a value greater than 0 and up to or equal to 10.

2. The polymer of claim 1 wherein R' represents an oxyalkylene group, $(BO)_nR"$ wherein B is a $C_2$–$C_3$ alkylene group or mixtures thereof; R" is a $C_1$–$C_3$ alkyl group; and n is an integer of from 1 to 70.

3. The polymer of claim 1 wherein R' represents hydrogen atom.

4. The polymer of claim 2 wherein at least a portion of A represents an oxyalkylene group $(BO)_nR"$ wherein B is a $C_2$–$C_3$ alkylene group or mixtures thereof; R" is a $C_1$–$C_3$ alkyl group; and n is an integer of from 1 to 70.

5. A polymer product useful as a cement admixture, said product formed according to the process comprising contacting (i) a polymer having functional groups selected from carboxylic acid groups, their $C_1$–$C_{10}$ alkyl esters or mixtures thereof, wherein said functional groups are positioned pendant alpha-beta, alpha-gamma or both from the polymer backbone chain, with (ii) an amine selected from ammonia or a primary amine of the formula $H_2N(BO)_nR"$ wherein O represents oxygen atom, B represents a $C_2$–$C_{10}$ alkylene group or mixtures thereof, R" represents a $C_1$–$C_{10}$ alkyl group, and n represents an integer of 1 to 200; maintaining said reaction mixture at a temperature of from 60° C. to 250° C. at atmospheric or reduced atmospheric pressure for a time of from 1 to 8 hours while removing water from the reaction mixture; and cooling and recovering the formed imidized polymer product.

6. A polymer product of claim 5 wherein the polymer is a polyacrylic acid or ester thereof and the amine is a primary amine having the formula $H_2N(BO)_nR"$ wherein O, B, R" and n are each defined in claim 5 above.

7. A polymer product of claim 6 wherein the polymer and primary amine are further contacted with a hydroxy terminated oxyalkylene compound of the formula $HO(BO)_nR"$ wherein O, B, n and R" each is defined in claim 5 above.

8. A polymer product of claim 6 wherein the polymer and the amine are contacted and maintained at a temperature of about 150° to 225° C. for a period of from 1.5 to 3 hours.

9. A polymer product of claim 6 wherein the polymer and the amine are contacted and maintained at a temperature of at least about 60° C. in the presence of a catalyst selected from an acid catalyst, basic catalyst or transamination catalyst.

10. A polymer product of claim 6 wherein the polymer and amine are first contacted and maintained at a temperature of from 150° to 225° C. for a period of from about 1 to 2 hours and subsequently maintained at a temperature of at least 75° C. in the presence of a catalyst selected from an acid catalyst, basic catalyst or transamination catalyst for a period of 1 to 3 hours.

* * * * *